(No Model.) 5 Sheets—Sheet 1.

P. & W. DEISSLER.
MEAT CUTTER.

No. 464,184. Patented Dec. 1, 1891.

WITNESSES: INVENTORS,
Peter Deissler
Wm Deissler
By S. J. Van Staworn
Attorney (No Model.) 5 Sheets—Sheet 3.

P. & W. DEISSLER.
MEAT CUTTER.

No. 464,184. Patented Dec. 1, 1891.

WITNESSES:

INVENTORS
Peter Deissler
Wm Deissler
By S. J. Van Stavoren
attorney (No Model.)  P. & W. DEISSLER.
MEAT CUTTER.

No. 464,184.   Patented Dec. 1, 1891.

WITNESSES:   INVENTORS (No Model.)  5 Sheets—Sheet 5.

P. & W. DEISSLER.
MEAT CUTTER.

No. 464,184.  Patented Dec. 1, 1891.

WITNESSES:
Geo. R. Byington
L. R. Miller

INVENTORS
Peter Deissler
Wm. Deissler
By S. J. Van Stavoren
Attorney

UNITED STATES PATENT OFFICE.

PETER DEISSLER AND WILLIAM DEISSLER, OF PHILADELPHIA, PENNSYLVANIA.

MEAT-CUTTER.

SPECIFICATION forming part of Letters Patent No. 464,184, dated December 1, 1891.

Application filed October 26, 1889. Serial No. 328,240. (No model.)

*To all whom it may concern:*

Be it known that we, PETER DEISSLER and WILLIAM DEISSLER, citizens of the United States, residing at Philadelphia, in the county of Philadelphia and State of Pennsylvania, have invented certain new and useful Improvements in Meat-Cutters, of which the following is a specification.

Our invention has relation to meat-cutters of the form having a series of rotating cutters operating against dead or fixed cutters in contradistinction to that form of meat-cutters having a perforated plate, into the perforations of which the meat or material is first pressed or pushed and then cut off by a rotating knife working against the inlet face or side of said perforated plate; and it has for its object the provision of a simple, economical, durable, effective, and quick-acting meat-cutter, the parts of which are easily detachable from one another to admit of quickly cleaning the same after being in use and are correspondingly put together, and in which the meat or other material is sliced to the requisite degree of fineness for domestic or cooking purposes in contradistinction to being minced or cut into fine particles.

Our invention consists of the combinations, constructions, and arrangements of parts, as hereinafter described in the specification and pointed out in the claims, reference being had to the accompanying drawings, wherein—

Figure 1:
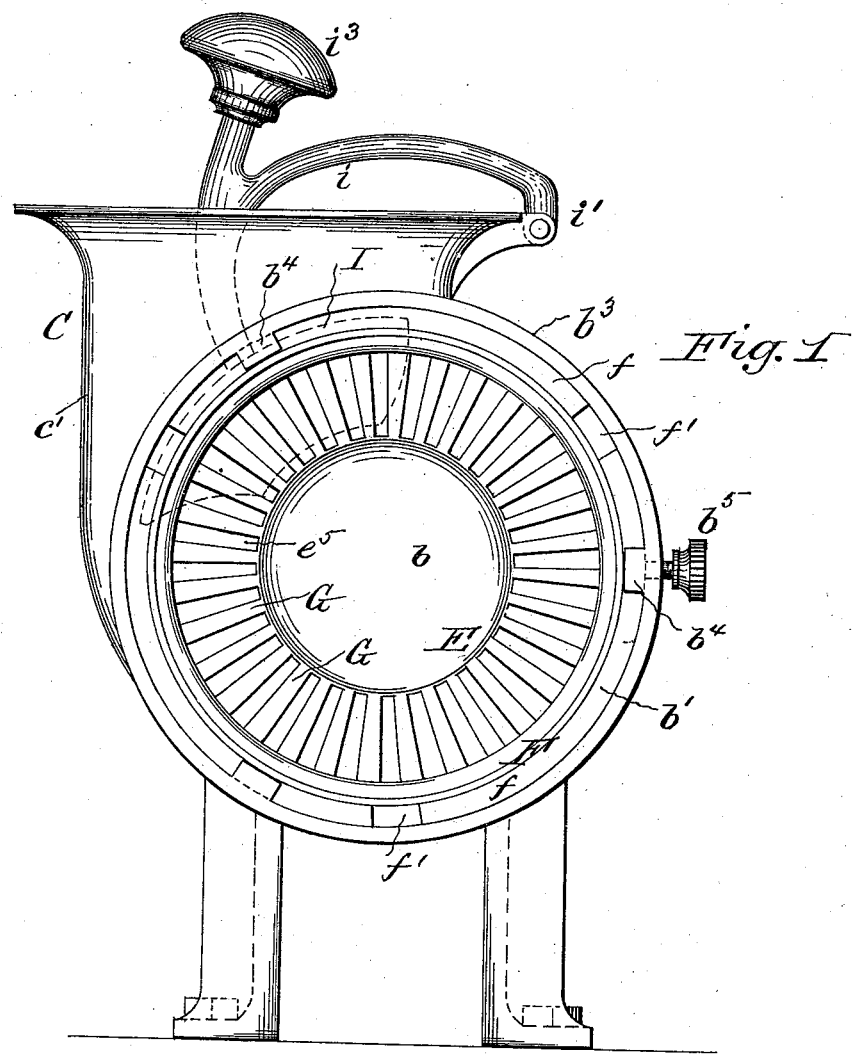
Figure 2:
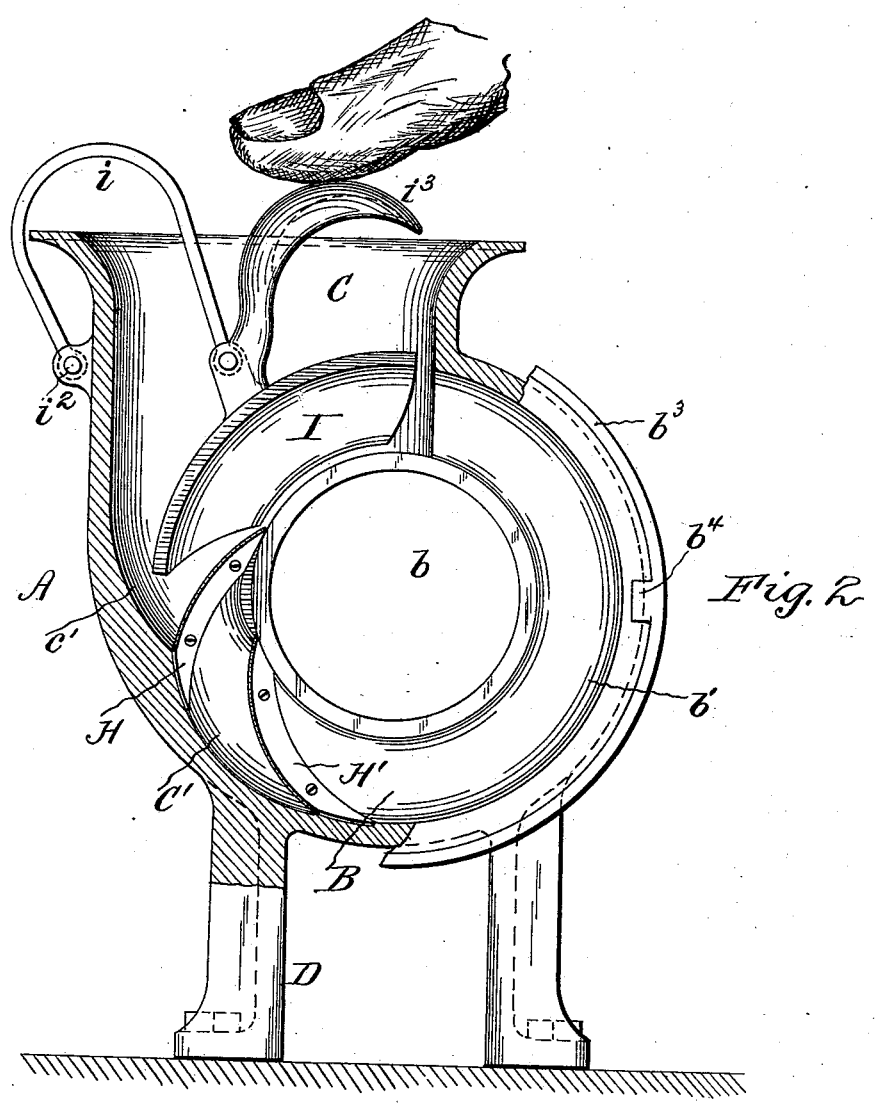
Figure 3:
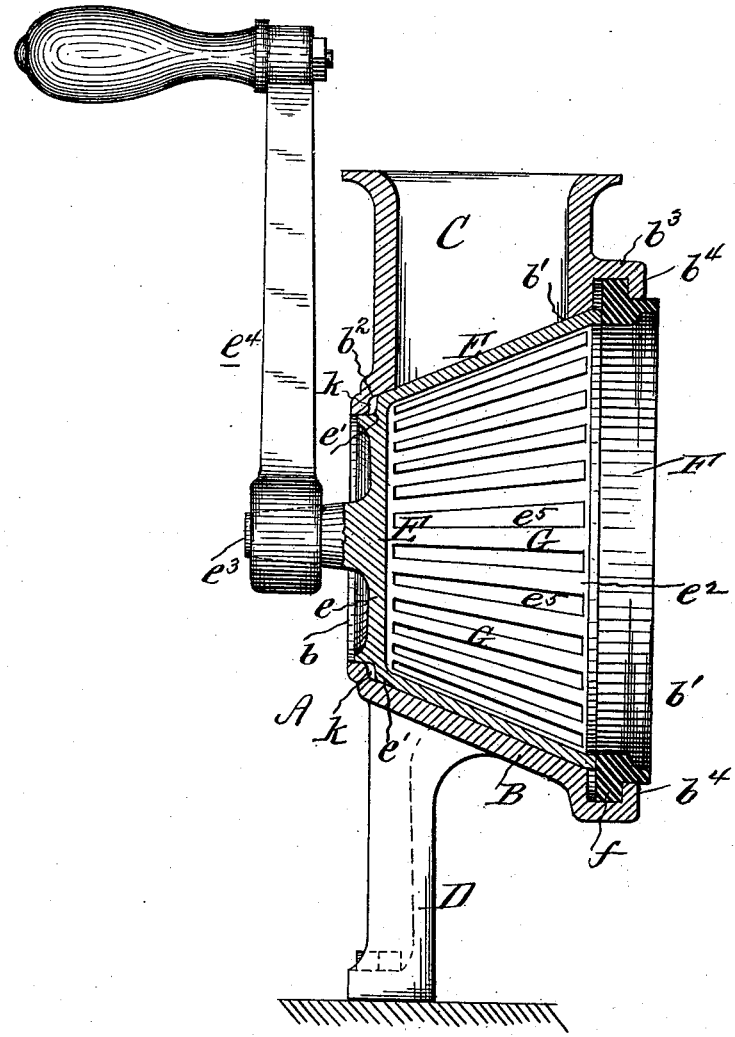
Figure 4:
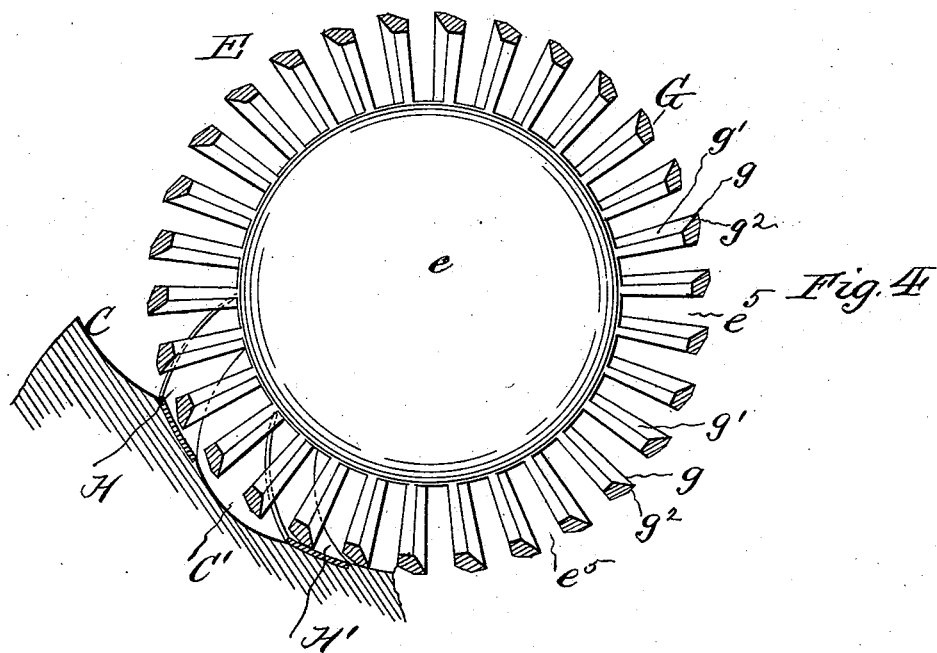
Figure 5:
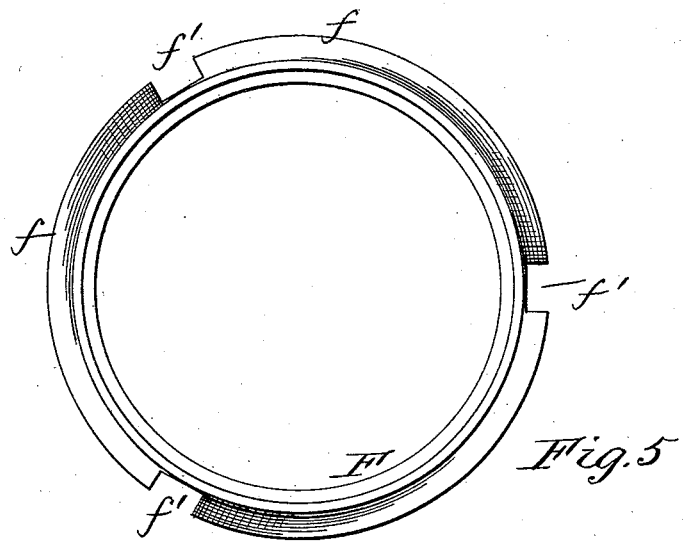
Figure 6:
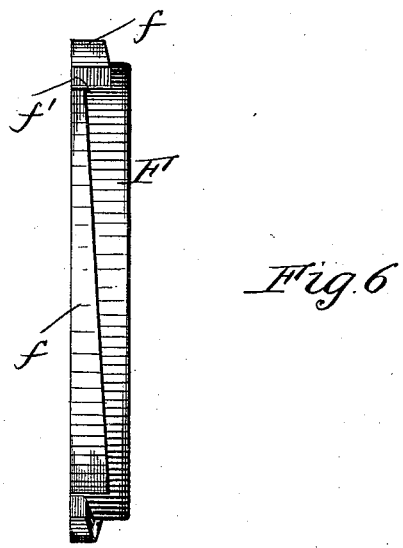

Figure 1 is an elevation of the cutter looking in the direction of the outlet side or end of the machine and showing one form of connection or mounting for the follower or presser-plate for feeding the meat to the cutters. Fig. 2 is a like view, partly sectional, with the rotating cutters removed and showing another or modified form of connection or mounting for the follower or presser-plate. Fig. 3 is a vertical section, partly in elevation, of the cutter in the direction lengthwise of the axis of its rotating cutters. Fig. 4 is a sectional elevation of the rotating cutters, part of the casing, and two dead or fixed knives or cutters for gradual reduction or cutting of the meat. Figs. 5 and 6 are respectively a face elevation and side view of the clamping or retaining and adjusting ring for the rotating cutters.

A represents the casing or housing, comprising, preferably, a cone-shaped body or chamber B, having open ends $b$ and $b'$, of which the former is the smaller and the latter the larger open end, as more plainly shown in Fig. 3, a hopper C, leading into said cone-shaped chamber B, and feet or supports D, which feet may be located, configured, and constructed as shown or as desired.

In the open end $b$ of chamber B is formed an annular shoulder or recess $b^2$, and exterior to the open end $b'$ of said chamber B is an annular flange $b^3$, having any desired number of inwardly-projecting lugs $b^4$. Said flange $b^3$ is provided with a set-screw $b^5$, (see Fig. 1,) which passes laterally through the flange, for a purpose hereinafter set forth.

E represents a rotating shell located within and fitting chamber B, said shell being cone-shaped to conform to the configuration of chamber B, and it has a closed smaller end $e$, with outside shoulder $e'$, fitting the end opening $b$ and annular recess $b^2$ of chamber B, respectively, as shown more plainly in Fig. 3. The opposite end $e^2$ of shell E is an open end, and against its edge impinges a ring F, having on its periphery radial lugs $f$, with intervals $f'$ between them. Said lugs $f$ are inclined or wedge-shaped in cross-section, as indicated more plainly in Fig. 6, to bear against the under sides of the lugs $b^4$ on flange $b^3$ and cause said ring F to hold the shell E in position. By suitably adjusting the ring F its end pressure on shell E may be varied as desired to admit of easy rotation of the shell or otherwise, as required, and also to move the shell axially or lengthwise, for a purpose hereinafter set forth, and by adjusting the set-screw $b^5$ in the flange $b^3$ to bite the ring F the latter is firmly or rigidly locked in its adjusted position to maintain the position of the shell E under the end pressure exerted by said ring F. The periphery of the shell E is slotted longitudinally, as indicated at $e^5$, to form a series of cutter-bars G, having cutting-edges $g$, formed by beveling said bars G on opposite sides of said edges, the inner sides $g'$ being beveled more than the outer sides $g^2$, as more plainly shown in Fig. 4. The inner sides $g'$ have the most bevel, in order to give the greatest clearance between said cutter-bars G for the escape of the cut meat through the shell-slots $e^5$ into the shell, and the sides $g^2$ have the least bevel, in order to effect a clean cut and avoid dragging of the meat between said sides and the wall of body or chamber B. Centrally projecting from the outside of end $e$ of shell E is a stud-shaft $e^3$, which may be of any desired form in cross-section for the reception of a turning crank or handle $e^4$.

Preferably at the junction of the curved hopper side $c'$ with chamber B is an angularly-located fixed or dead cutter-bar H, which may be of any suitable form and secured in any desired way to the chamber B. (See more plainly Fig. 2.) Only one of these cutters H may be used, in which case it is so located or set that it is close to or bears against the cutters G on shell E; but if more than one cutter H is used, as shown in Figs. 2 and 4, the first cutter H is located a slight distance away from the cutters G on the shell, or, in other words, said cutters G and first cutter H do not contact with each other and are set to cut coarse, and the second cutter H' contacts with or is set close to the cutters G on shell E, so that the first cutter H and the cutters G cut coarse and the second cutter H' and cutters G cut fine to effect a gradual reduction or cutting of the meat instead of effecting the reduction by a single cut.

When two or more cutters H H' are used, the wall of chamber B between the cutters is recessed or cut away to form secondary hoppers C' between the cutters H H', as shown more plainly in Fig. 2.

Within hopper C is a suitable presser-plate or follower I for feeding the meat to the cutters. As shown, it is of a segmental form curved or inclined to correspond to the cuneiform outline of the shell E and chamber B, and it is suitably pivoted by a link connection $i$ to the hopper C, as indicated at either $i'$, Fig. 1, or at $i^2$, Fig. 2, so as to admit of raising it out of the hopper when the latter is to be filled or charged. Said follower or presser-plate I is provided with a suitable knob or toe $i^3$, to which the pressure of the hand or finger is applied to effect the feed of the meat to the cutters H and G.

From the foregoing it will be noted that the shell E carries the rotating cutters or knives G, and that these cutters are inclined or flare outwardly from the smaller and closed end $e$ to the open and larger end $e^2$ of the shell E; that the one or more fixed knives or cutters H H' are located at an angle to the rotating cutters G, so that any fixed cutter H H' overlaps or extends across a number of the rotating cutters G, as more plainly indicated in Fig. 4, to cause said cutters to make a shear cut and also to provide for two or more of the cutters G cutting at once as they rotate past any of the fixed cutters H H'; that the direction of travel of the meat is through the hopper to the cutters H H' and through the shell E, and thence out of its open end $e^2$ and the open end of the chamber B, the escape of the cut meat from the latter being assisted by the inclination of said shell and chamber; that as the shell cutters G or the fixed cutters H H' wear such wear is taken up by adjusting the ring F to slide the shell axially toward the open end $b$ of the chamber B, suitable play-space $k$ (see Fig. 3) being provided between the shoulder or recess $b^2$ in said open end $b$ of chamber B and the shoulder $e'$ on shell E to admit of such adjustment of shell E to take up said wear of the cutters; that said adjusted positions of the ring F and of the shell E are maintained by the set-screw $b^5$ on the flange $b^3$, and that by varying the end pressure of the ring F on the shell E its looseness in its bearings is varied as desired, so that it may turn easily or otherwise, as required.

The operation is as follows: The follower or presser-plate I is first raised from the hopper to admit of inserting the meat or other material into the hopper. As the meat is dropped into the hopper it falls directly upon the rotating shell E or its cutters G G and is by them dragged down or carried to the fixed cutter H. If the pieces of meat are small and are successively dropped into the hopper, the feeding action of the shell E and its cutters G may be sufficient to carry all the meat to the cutter H without using the follower or presser-plate I to assist such feeding action; but where the pieces are large or the hopper is fully charged the presser-plate I is then preferably used to assist the feed of the shell E, as the use of the plate I avoids all danger of cutting the fingers of the operator if they be used to press down the meat in the hopper. As the cutters G G or the shell E is rotated by the crank $e^4$, the cutters G first make a shear cut across the fixed cutter H to coarsely slice the meat. As each slice is made by a shear cut, it, as it is cut, curls over into the space or slot $e^5$ between succeeding cutters $g$ and drops into the secondary hopper C' between the cutters H H'. In curling over and dropping into the hopper C' the slices present their ends instead of their long sides to the cutting action of the succeeding fixed cutter H' and rotating cutters $g$ to be further sliced into numerous small and thin slices, and these thin and small slices as they are cut pass through the slots or spaces $e^5$ between the cutters G G to the inner face of the shell E, and if no scraper is used to force them through and out of the open end $b'$ of the machine they accumulate on and are carried around on the inner face of the shell E until they of their own accord drop off of the same and fall out of said open end. The meat so cut is sliced in contradistinction to being minced or cut into fine particles; but as the last slicing is in effect cutting numerous transverse slices from the long coarse slices and is done by a fixed cutter contacting with or set close to the rotating cutters the slices are in a finely-divided state and of small extent and are as suitable for cooking or other purposes as if in a minced condition.

The cutters G on the shell E, as shown, are cast integral therewith, but they may otherwise be made, as desired.

By turning the ring F so that the spaces $f'$ between the inclined lugs $f$ register with the lugs $b^4$ on the flange $b^3$ the ring F can be removed from the flange $b^3$ and from casing A, and by removing the crank $e^4$ from shell stud-shaft $e^3$ the shell E can be instantly removed from casing-chamber B for easily and quickly cleaning all of said parts after being used, and by reversing said operations said parts are as readily put together for slicing or cutting purposes.

It will be noted that all the parts of the cutters are foundry finished, except the finishing required for bearings for the shell E for its cutters G and for the pivotal connections for the follower or presser-plate I. If desired, however, the link connections for mounting the presser-plate upon the casing A may be dispensed with, in which case said plate is separate from the cutter.

What we claim is—

1. In a meat-cutter, the combination of a casing A, having cone-shaped chamber B, with open ends $b$ and $b'$, an annular shoulder or recess in open end $b$, and a hopper C, fixed angularly-arranged cutter or cutters in chamber B, rotating shell E, having closed end $e$, with shoulder $e'$, fitting end $b$ of chamber B, and open end $e^2$, turning handle for shell E, and locking and adjusting ring F for shell E, substantially as set forth.

2. A meat-cutter casing having a cone-shaped chamber with open ends, one of which is the exit end for the cut meat, an annular flange on said casing at said outlet end, lugs on said flange, and fixed cutter or cutters within said cone-shaped chamber, in combination with rotating cutter-carrying shell E and locking-ring F, substantially as set forth.

3. The combination of hopper C, cone-shaped chamber B, fixed angularly-arranged cutter or cutters in said chamber, rotating shell E, having closed end $e$, with shoulder $e'$, fitting end $b$ of chamber B, and locking-ring F for shell E, as set forth.

4. The combination of casing A, cone-shaped chamber B, with open exit end, fixed angularly-arranged cutters in chamber B, a rotating cutter carrying shell E, and locking and adjusting ring F, as set forth.

In testimony whereof we affix our signatures in presence of two witnesses.

PETER DEISSLER.
WILLIAM DEISSLER.

Witnesses:
S. J. VAN STAVOREN,
CHAS. F. VAN HORN.